March 17, 1959 J. R. A. BEALE 2,878,148

METHOD OF MANUFACTURING SEMI-CONDUCTIVE DEVICES

Filed April 26, 1957

INVENTOR
J. R. A. BEALE
BY
Frank R. Jenifer
AGENT

United States Patent Office 2,878,148

Patented Mar. 17, 1959

2,878,148

METHOD OF MANUFACTURING SEMI-CONDUCTIVE DEVICES

Julian Robert Anthony Beale, Wraysbury, near Staines, England

Application April 26, 1957, Serial No. 655,291

Claims priority, application Great Britain April 25, 1956

4 Claims. (Cl. 148—1.5)

The present invention relates to a method of manufacturing a semi-conductive device, and in particular to a method of applying an electrode onto a semi-conductor body by alloying. Such a method is frequently used in the manufacture of semi-conductive devices, e. g., crystal diodes or transistors.

The object of the present invention is to provide a new method of alloying an electrode to a semi-conductor. The electrode may be either non-linear or ohmic.

According to the present invention, this method comprises the steps of placing a jig having an aperture passing through it on the semi-conductor body so that the aperture extends substantially vertically, and introducing a wire into the aperture to touch or contact the semi-conductor, the possible further travel of the wire into the aperture being limited. The wire is of a material which forms with the semi-conductor an alloy having a melting point lower than those of the material and the semi-conductor alone, and the phase diagram of the alloy constituents being such that, on cooling, a non-eutectic alloy having the semi-conductor in excess of eutectic proportion solidifies first. The wire and semi-conductor are heated to a temperature above the melting point of the alloy but below the melting points of the material and the semi-conductor such that alloying occurs and an electrode is provided.

The possible further travel of the wire into the aperture may be limited by part of the wire being bent over above the jig so that alloying proceeds during the heating step until the bent-over part makes contact with, and further travel is arrested by, the jig. It will be obvious that the said limitation may as an alternative be provided by clamping a member, such as a bead, to the wire or by bending the wire in a manner different from that described above.

Contact with the resultant electrode may be established by soldering a conductor thereto or a point contact to the electrode may be provided.

Figure 1:
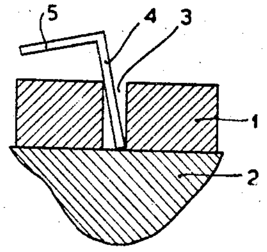
Figure 2:
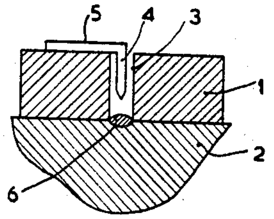
Figure 3:
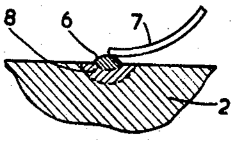

A semi-conductive body, a semi-conductive device and a method according to the present invention will now be described by way of example with reference to the accompanying diagrammatic drawing, in which:

Figures 1 and 2 show, in cross-sectional view, stages in the manufacture of a semi-conductor body according to the present invention; and Figure 3 shows a cross-section of part of a completed semi-conductive body.

Referring now to Figure 1, a jig 1 is placed on the surface of a single crystal wafer 2 of n-type germanium. The jig 1 is of carbon and comprises an aperture 3. The jig is so arranged that the aperture 3 extends substantially vertically above the wafer 2 and substantially at right angles to the surface of the crystal 2 at the aperture 3.

The cross-dimensions of the aperture 3 are such that it affords ready passage for a wire 4 of gold. When the lower end of the wire 4 touches the crystal 2, a bent over portion 5 at the upper end stands above the upper surface of the jig 1.

The assembly is then put into a furnace and heated to a temperature above 356° C. and below 936° C. When the temperature rises above 356° C., the gold alloys with the germanium and a blob 6 of alloy is formed at the bottom of the aperture 3 and extending into the crystal 2 (see Figure 2). As the alloying proceeds, the wire 4 feeds down under the influence of surface tension and gravity until the portion 5 makes contact with the jig 1 and arrests the motion of the wire 4. As the heating further proceeds, the alloy blob detaches itself from the dependent wire under influence of gravity and against the influence of surface tension, and the heating is thereupon stopped. As a specific example, a gold wire was used of about 2 thousandths of an inch in diameter, the aperture was about 10 thousandths of an inch in diameter, and the travel of the wire into the aperture was about 4 thousandths of an inch.

After the alloy blob has detached itself from the dependent wire, the liquid alloy is allowed to recrystallise by cooling and an electrode having a diameter of about 5 thousandths of an inch solidifies. Since the alloy was heated above the eutectic point for germanium and gold and was in contact with germanium, the liquid contained more than the eutectic concentration of germanium. On cooling, this excess germanium recrystallises on the undissolved n-type germanium and as it is saturated with gold, a conductivity-determining impurity of the acceptor type, the recrystallised germanium is p-type and thus a p-n junction is formed. It is presumed that further solidification is substantially of the 73% Au—27% Ge eutectic.

A connection (not shown) may then be provided to the crystal 2 and a connecting wire 7 (Figure 3) secured to the electrode 6 by any known soldering technique.

Finally, the crystal is suitably etched, washed and dried to provide a semi-conductor diode having a clean surface. One suitable technique is the use of a chemical etch in a bath of 20 vol. hydrogen peroxide at 70° C. for thirty minutes. The etching is followed by washing in distilled water and drying.

In general, when providing a non-linear electrode, it is advisable to alloy at a higher temperature within the permissible temperature range in order to produce a better junction in respect of reverse-voltage breakdown.

What is claimed is:

1. A method of forming an alloy electrode on a semi-conductive body, comprising providing an apertured jig member on the semi-conductive body so that the aperture extends substantially vertically above the body, introducing a wire comprising a conductivity-determining impurity into the aperture so that one end contacts the body, said wire being able to alloy with the semi-conductive body when contacting the latter at a temperature below the melting points of the wire and the body, heating the assembly at a temperature above the melting point of the alloy but below the melting points of the wire and body so that the wire end melts within the confines of the jig forming an alloy with the contacted portion of the semi-conductive body and so that the wire gravity-sags downward as its end contacting the semi-conductive body continues to melt, thereafter arresting the downward motion of the wire at a point remote from its contacting end after a predetermined portion of the wire end has been melted and to prevent further melting of the solid wire by terminating its contact with the semi-conductive body, and thereafter cooling the assembly, causing the melt to refreeze and producing an impurity-doped regrown semi-conductive region on an unmelted portion of the body.

2. A method as set forth in claim 1 in which, prior to the heating step, a portion of the wire remote from said one end is bent so as to extend over the jig member, said bent-over portion acting to automatically arrest the downward motion of the wire.

3. A method as set forth in claim 2, wherein, after the cooling steps, a contact is soldered to the thus-produced electrode.

4. A method of forming an alloy electrode on a semi-conductive body, comprising providing an apertured jig member on the semi-conductive body so that the aperture extends substantially vertically above the body, introducing a wire comprising a conductivity-determining impurity into the aperture so that one end contacts the body, bending a portion of the wire remote from the said one end so that the bent portion extends over the jig, said wire being able to alloy with the semi-conductive body when contacting the latter at a temperature below the melting points of the wire and the body, heating the assembly at a temperature above the melting point of the alloy but below the melting points of the wire and body so that the wire end melts within the confines of the jig forming an alloy with the contacted portion of the semi-conductive body and so that the wire gravity-sags downward as its end contacting the semi-conductive body continues to melt, said downward motion of the wire being arrested after a predetermined portion of the wire end has been melted by the bent portion contacting the jig so as to prevent further melting of the solid wire by terminating its contact with the semi-conductive body, and thereafter cooling the assembly, causing the melt to refreeze and producing an impurity-dope regrown semi-conductive region on an unmelted portion of the body.

References Cited in the file of this patent

UNITED STATES PATENTS

| | | |
|---|---|---|
| 2,736,847 | Barnes | Feb. 28, 1956 |